(12) United States Patent
Park et al.

(10) Patent No.: US 11,153,788 B2
(45) Date of Patent: Oct. 19, 2021

(54) HANDOVER METHOD AND USER EQUIPMENT

(71) Applicant: LG Electronics Inc., Seoul (KR)

(72) Inventors: Sangmin Park, Seoul (KR); Jinsook Ryu, Seoul (KR); Hyunsook Kim, Seoul (KR); Myungjune Youn, Seoul (KR); Jaehyun Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 232 days.

(21) Appl. No.: 16/348,702

(22) PCT Filed: Nov. 9, 2017

(86) PCT No.: PCT/KR2017/012648
§ 371 (c)(1),
(2) Date: May 9, 2019

(87) PCT Pub. No.: WO2018/088812
PCT Pub. Date: May 17, 2018

(65) Prior Publication Data
US 2019/0289506 A1 Sep. 19, 2019

Related U.S. Application Data

(60) Provisional application No. 62/419,475, filed on Nov. 9, 2016, provisional application No. 62/419,476, filed on Nov. 9, 2016.

(51) Int. Cl.
*H04W 36/26* (2009.01)
*H04W 36/14* (2009.01)
(Continued)

(52) U.S. Cl.
CPC ......... *H04W 36/0022* (2013.01); *H04W 8/08* (2013.01); *H04W 36/00* (2013.01);
(Continued)

(58) Field of Classification Search
CPC . H04W 36/0022; H04W 36/00; H04W 76/27; H04W 36/14; H04W 36/26
See application file for complete search history.

(56) References Cited

U.S. PATENT DOCUMENTS

2012/0269167 A1* 10/2012 Velev ............... H04W 36/0011
370/331
2014/0056243 A1* 2/2014 Pelletier ........... H04W 72/1263
370/329

(Continued)

FOREIGN PATENT DOCUMENTS

CN 103139142 6/2013
CN 105009678 10/2015
(Continued)

OTHER PUBLICATIONS

3GPP; Technical Specification Group Services and System Aspects; Study on Architecture for Next Generation System (Release 14), 3GPP TR 23.799 V1.1.0, dated Oct. 31, 2016, 503 pages.

(Continued)

*Primary Examiner* — Faruk Hamza
*Assistant Examiner* — Abusayeed M Haque
(74) *Attorney, Agent, or Firm* — Fish & Richardson P.C.

(57) ABSTRACT

A user equipment according to the present invention performs a handover from a first system to a second system. When a user equipment receives a command to hand over to the second system, while using a plurality of protocol data unit (PDU) sessions for the same data network (DN) in the first system, the user equipment transmits first session information of a first PDU session among the plurality of PDU sessions, establishes a packet data network (PDN) connection with the second system, on the basis of the first session information, and maps the first PDU session to the PDN connection. When the user equipment is required to establish a dedicated bearer for a PDU session (second PDU session)

(Continued)

other than the first PDU session among the plurality of PDU sessions, the user equipment transmits a bearer generation request message requesting to generate a dedicated bearer for the PDN connection.

8 Claims, 13 Drawing Sheets

(51) Int. Cl.
  *H04W 36/16* (2009.01)
  *H04W 76/27* (2018.01)
  *H04W 36/00* (2009.01)
  *H04W 8/08* (2009.01)

(52) U.S. Cl.
  CPC ....... *H04W 36/0044* (2013.01); *H04W 36/14* (2013.01); *H04W 36/26* (2013.01); *H04W 76/27* (2018.02)

(56) References Cited

U.S. PATENT DOCUMENTS

| | | | | |
|---|---|---|---|---|
| 2014/0219248 A1* | 8/2014 | Reddiboyana | ........ | H04W 76/15 370/331 |
| 2016/0142954 A1* | 5/2016 | Cho | ................. | H04W 36/0066 370/331 |
| 2016/0353337 A1* | 12/2016 | Zhu | ................... | H04W 36/0055 |
| 2017/0099650 A1* | 4/2017 | Kim | ......................... | H04L 1/00 |
| 2017/0251405 A1* | 8/2017 | Stojanovski | ...... | H04W 36/0016 |
| 2018/0288670 A1* | 10/2018 | Li | ......................... | H04W 8/186 |
| 2021/0014765 A1* | 1/2021 | Shan | ....................... | H04W 8/02 |

FOREIGN PATENT DOCUMENTS

| | | |
|---|---|---|
| CN | 105764143 | 7/2016 |
| KR | 1020100053623 | 5/2015 |
| KR | 1020140080550 | 6/2015 |
| KR | 101539982 | 7/2015 |
| WO | WO2015160329 | 10/2015 |
| WO | WO2016016338 | 2/2016 |

OTHER PUBLICATIONS

Motorola Mobility, Lenovo, "Considerations for IP Session Continuity," S2-161020, SA WG2 Meeting #113AH, Sophia Antipolis, France, Feb. 23-26, 2016, 5 pages.

PCT International Search Report and Written Opinion in International Application No. PCT/KR2017/012648, dated Feb. 8, 2018, 18 pages (with English translation).

Extended European Search Report in European Application No. 17870125.6, dated May 29, 2020, 11 pages.

Chinese Office Action in Chinese Application No. 201780069452.7, dated Nov. 3, 2020, 18 pages (with English translation).

* cited by examiner (a) UE-P-GW user plane with E-UTRAN (b) Control Plane UE-MME (a)

(b)

HANDOVER METHOD AND USER EQUIPMENT

CROSS-REFERENCE TO RELATED APPLICATIONS

This application is a National Stage application under 35 U.S.C. § 371 of International Application No. PCT/KR2017/012648, filed on Nov. 9, 2017, which claims the benefit of U.S. Provisional Application No. 62/419,476, filed on Nov. 9, 2016, and U.S. Provisional Application No. 62/419,475, filed on Nov. 9, 2016. The disclosures of the prior applications are incorporated by reference in their entirety.

TECHNICAL FIELD

The present invention relates to a wireless communication system and, more particularly, to a handover method between systems and an apparatus therefor.

BACKGROUND ART

Wireless communication systems have been widely deployed to provide various types of communication services such as voice or data. In general, the wireless communication system corresponds to a multiple access system capable of supporting communication between multiple users by sharing available system resources (e.g., bandwidth, transmission power, etc.). For example, the multiple access system includes a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at anytime and anywhere by connecting a plurality of devices and objects to each other is one main issue to be considered in next generation communication. Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of smart devices, a new method of efficiently transmitting/receiving small volumes of data or efficiently transmitting/receiving data generated with a low frequency is needed.

In addition, the present invention requires an efficient intersystem change method between a legacy system and a next-generation system according to introduction of the next-generation system.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of performing handover from a first system to a second system by a user equipment (UE). The method includes: receiving a command for handover to the second system; transmitting first session information regarding a primary protocol data unit (PDU) session among a plurality of PDU sessions for the same data network (DN), that the UE is using in the first system; establishing a packet data network (PDN) connection with the second system based on the first session information and mapping the primary PDU session to the PDN connection; if a dedicated bearer for PDU sessions (secondary PDU sessions) other than the primary PDU session among the plural PDU sessions needs to be established, transmitting a bearer create request message for requesting creation of the dedicated bearer for the PDN connection.

In another aspect of the present invention, provided herein is a user equipment (UE) for performing handover from a first system to a second system. The UE includes a radio frequency (RF) unit, and a processor configured to control the RF unit. The processor is configured to: control the RF unit to receive a command for handover to the second system; control the RF unit to transmit first session information regarding a primary protocol data unit (PDU) session among a plurality of PDU sessions for the same data network (DN), that the UE is using in the first system; establish a packet data network (PDN) connection with the second system based on the first session information and map the primary PDU session to the PDN connection; and if a dedicated bearer for PDU sessions (secondary PDU sessions) other than the primary PDU session among the plural PDU sessions needs to be established, control the RF unit to transmit a bearer create request message for requesting creation of the dedicated bearer for the PDN connection.

In each aspect of the present invention, the UE may transmit the first session information and deactivate the secondary PDU sessions. The UE may reactivate the deactivated secondary PDU sessions by mapping the secondary PDU sessions to a default bearer of the PDN connection or the dedicated bearer after establishing the PDN connection.

In each aspect of the present invention, if a default bearer of the PDN connection does not satisfy a quality of service (QoS) level of the secondary PDU sessions, the UE may transmit the bearer create request message. The UE may generate the dedicated bearer within the PDN connection. The UE may map the secondary PDU sessions to the dedicated bearer.

In each aspect of the present invention, if the default bearer satisfies a QoS level of the secondary PDU sessions, the UE may map the secondary PDU sessions to the default bearer of the PDN connection without transmitting the bearer create request message.

In each aspect of the present invention, if the primary PDU session is session and service continuity (SSC) mode 1, the first session information may include an Internet protocol (IP) address of the primary PDU session. If the primary PDU session is not SSC mode 1, the first session information may not include the IP address of the primary PDU session.

In each aspect of the present invention, if the primary PDU session is SSC mode 1, an Internet protocol (IP) address of the PDN connection may be equal to an IP address of the primary PDU session used in the first system.

In each aspect of the present invention, the second system may be an evolved packet system (EPS) and the first system may be a new system (e.g., a 5G system) more evolved than the second system.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to the present invention, efficient intersystem change between a legacy system and a next-generation system can be performed.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
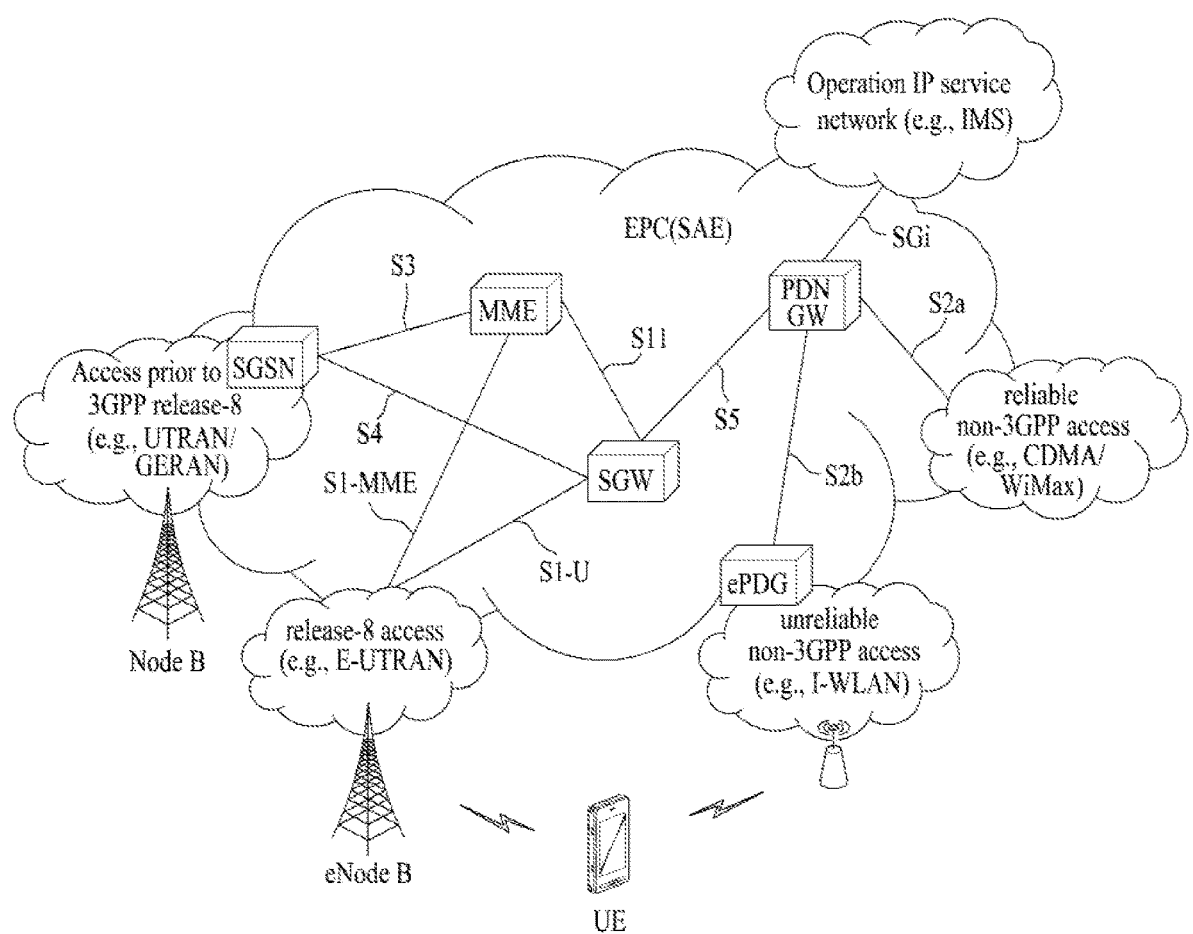
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401 and 3GPP TS 24.301 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a non-portable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: Association between a UE represented by one IP address (one IPv4 address and/or one IPv6 prefix) and a PDN represented by an APN.

EPS bearer: A transport path set between a UE and a P-GW to deliver user traffic (IP packets) having specific QoS. One EPS bearer uniquely identifies traffic flows receiving common QoS treatment between the UE and the P-GW. The EPS bearer refers to IP flows of aggregated service data flows (SDFs) that have the same QoS class. The SDF refers to a group of IP flows of associated with a service that is being used by a user. The EPS bearer includes two types: a default EPS bearer and a dedicated EPS bearer.

Default (EPS) bearer: The first EPS bearer activated when an EPS session (PDN connection) is generated. When a UE attaches to an LTE network, the UE is attached an IP address to be used in a PDN and connects to the PDN and, simultaneously, the default EPS bearer is established.

Dedicated (EPS) bearer: An additional EPS bearer activated on demand after an EPS session (PDN connection) is created. If a user that is using a service (e.g., Internet) through a default bearer attempts to use a service (e.g., VoD) demanding higher QoS that cannot be provided by a current default bearer, the dedicated bearer is established on demand.

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network. FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
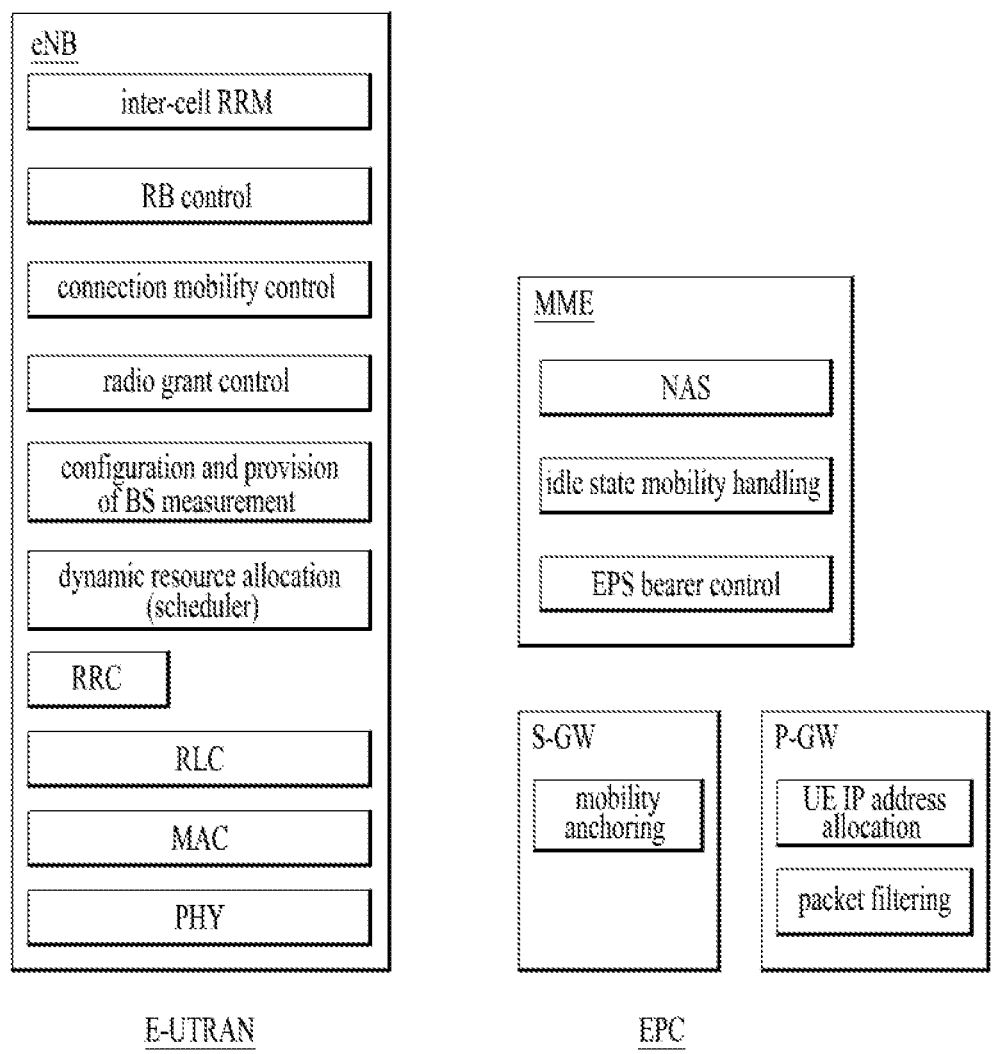
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE IDLE state management, ciphering of the user plane, SAE bearer control, and ciphering and integrity protection of NAS signaling.

Figure 3:
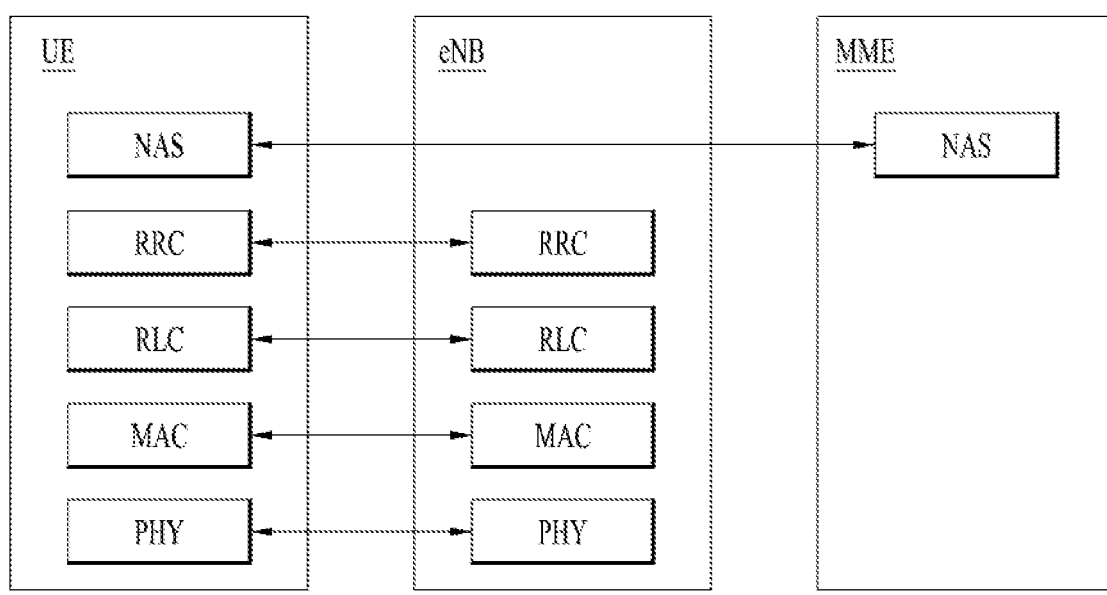
FIG. 3 is a diagram exemplarily illustrating the structure of a radio interface protocol in a control plane.
Figure 4:
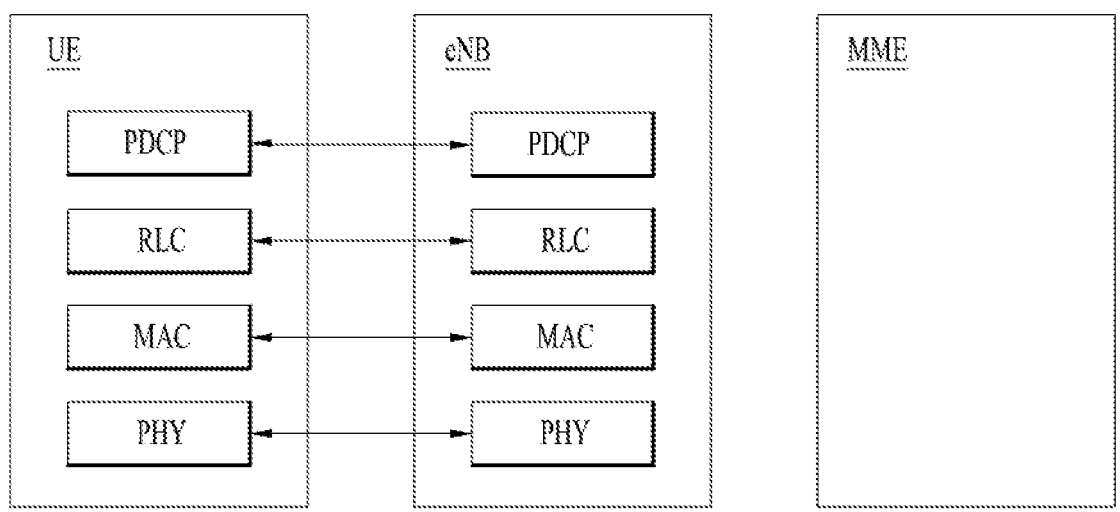
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish an RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (EPS Session Management) belonging to the NAS layer performs functions such as default bearer management and dedicated bearer management to control a UE to use a PS service from a network. A default bearer resource is assigned from the network during initial access to a specific packet data network (PDN). In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
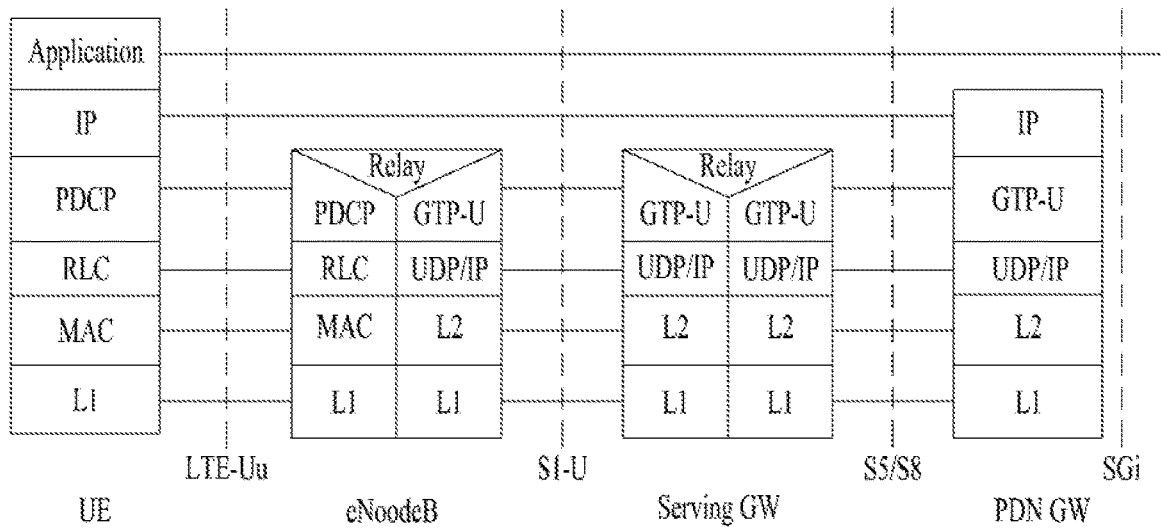
FIG. 5 is a diagram illustrating LTE (Long Term Evolution) protocol stacks for a user plane and a control plane.
Figure 5:
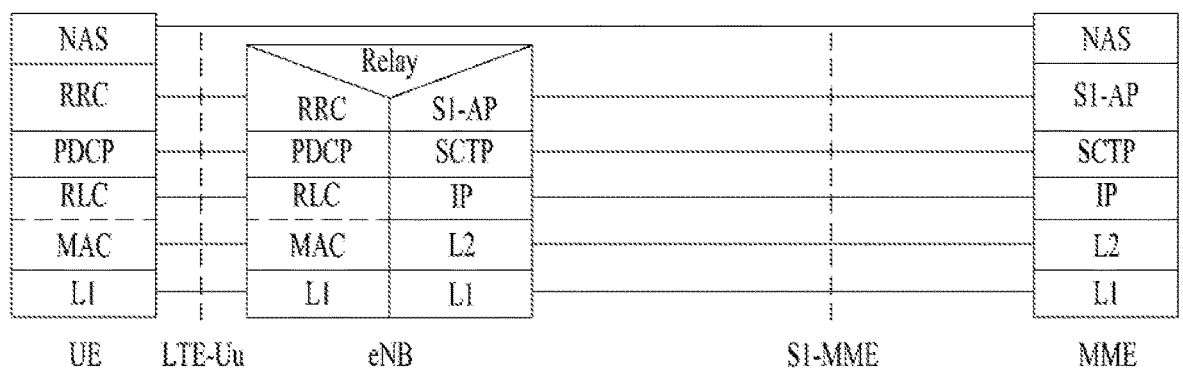

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
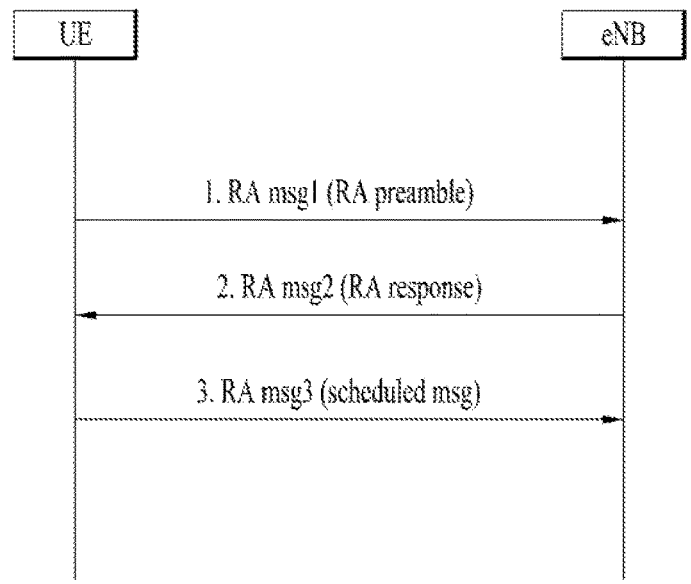
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
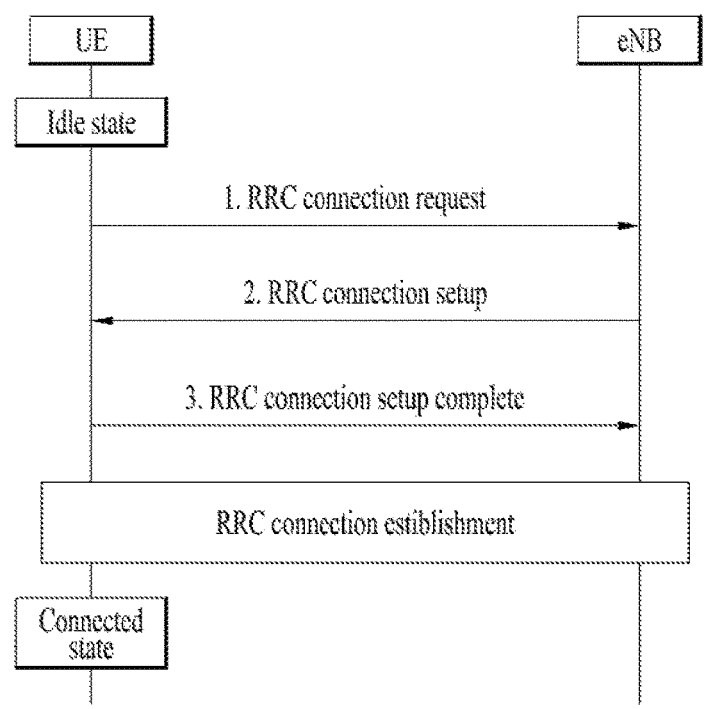
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In current 3GPP, study on a NextGen mobile communication system after an EPC is being conducted. To design a next-generation mobile network system, e.g., a 5G core network, 3GPP has defined service requirements through the study on services and markets technology enablers (SMARTER). In addition, system architecture 2 (SA2) has conducted the study on architecture for next generation system (FS NextGen) based on SMARTER. In 3GPP TR 23.799, the following terminologies are defined for a NextGen system (NGS).

Evolved E-UTRA: RAT that refers to an evolution of the E-UTRA radio interface for operation in the NextGen system.

Network Capability: Is a network provided and 3GPP specified feature that typically is not used as a separate or standalone "end user service", but rather as a component that may be combined into a telecommunication service that is offered to an "end userFor example, the location service is typically not used by an "end user" to simply query the location of another UE. As a feature or network capability it might be used e.g. by a tracking application, which is then offering as the "end user service". Network capabilities may be used network internally and/or can be exposed to external users, which are also denoted a 3rd parties.

Network Function: In this TR, Network function is a 3GPP adopted or 3GPP defined processing function in a network, which has defined functional behaviour and 3GPP defined interfaces. A network function can be implemented either as a network element on a dedicated hardware, or as a software instance running on a dedicated hardware, or as a virtualised function instantiated on an appropriate platform, e.g. on a cloud infrastructure.

NextGen Core Network: A core network specified in the present document that connects to a NextGen access network.

NextGen RAN (NG RAN): In the context of this document, it refers to a radio access network that supports one or more of the following options:

Standalone New Radio,

Standalone New Radio is the anchor with Evolved E-UTRA extensions,

Evolved E-UTRA,

Evolved E-UTRA is the anchor with New Radio extensions.

NG RAN has common characteristics in that a RAN interfaces with a NextGen core.

NextGen Access Network (NG AN): It refers to a NextGen RAN or a Non-3GPP access network and interfaces with the next generation core.

NextGen System (NG System): It refers to NextGen system including NextGen Access Network (NG AN) and NextGen Core.

NextGen UE: A UE connecting to a NextGen system.

PDU Connectivity Service: A service that provides exchange of PDUs between a UE and a data network.

PDU Connectivity Service: A service that provides exchange of PDUs between a UE and a data network.

PDU Session: Association between the UE and a data network that provides a PDU connectivity service. The type of the association includes IP type, Ethernet type and non-IP type. In other words, a legacy session has IP type, whereas, in NextGen, sessions may be distinguished even according to Ethernet type or non-IP type.

PDU Session of IP Type: Association between the UE and an IP data network.

Service Continuity: The uninterrupted user experience of a service, including the cases where the IP address and/or anchoring point changes.

Session Continuity: The continuity of a PDU session. For PDU session of IP type "session continuity" implies that the IP address is preserved for the lifetime of the PDU session.

Figure 8:
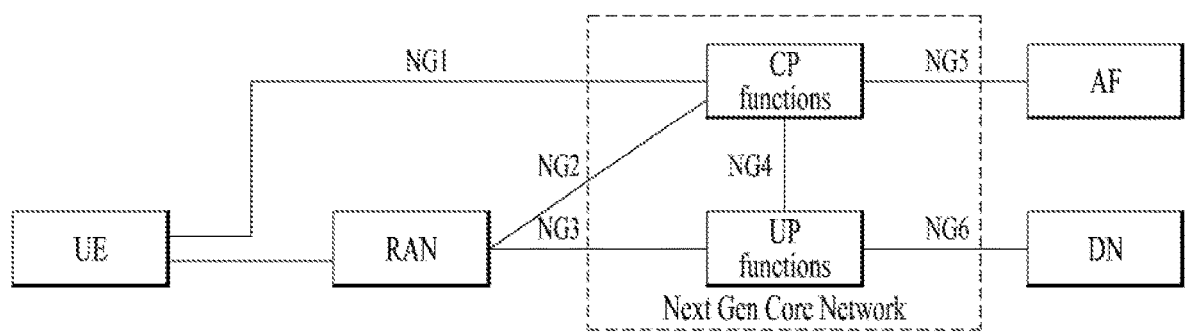
FIG. 8 illustrates a basic structure of a next-generation system (hereinafter, NextGen), particularly, an interface between main entities.

FIG. 8 illustrates a basic structure of a next-generation system (hereinafter, NextGen), particularly, an interface between main entities. In particular, FIG. 8 illustrates the naming of reference points of a next-generation system (hereinafter, NextGen).

Depicted in FIG. 8 is a reference model of a potential architecture including potential functional entities and potential reference points. The naming in particular of the reference points may be used in individual solution proposals for a better understanding and comparison. This reference model does not make any assumption on the actual target architecture i.e. the target architecture may not have all of the depicted reference points or functional entities or may have additional/other reference points or functional entities.

In FIG. 8, the Control plane functions and the User plane functions of the NextGen core are depicted as single boxes (CP functions and UP functions, respectively). Individual solution proposals may further split or replicate CP or UP functions. In that case the naming of additional reference point could add an index to the depicted reference point (e.g. NG4.1, NG4.2).

In FIG. 8, RAN here refers to a radio access network based on the 5G RAT or Evolved E-UTRA that connects to the NextGen core network. The following reference points are illustrated in FIG. 8.

NG1: Reference point between the UE and the CP functions.

NG2: Reference point between the RAN and the CP functions.

NG3: Reference point between the RAN and the UP functions.

NG4: Reference point between the CP functions and the UP functions.

NG5: Reference point between the CP functions and an Application Function.

NG6: Reference point between the UP functions and a Data Network (DN).

Some reference points in FIG. 8 may consist of several reference points depending on how the CP functions and UP functions may be further split.

Figure 9:
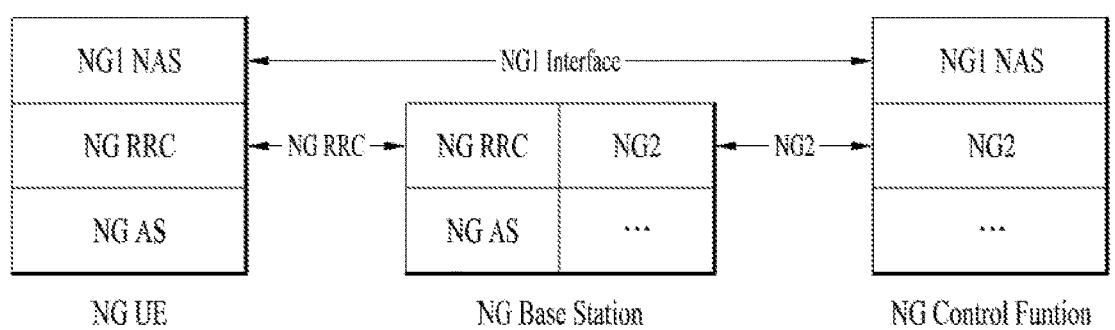
FIG. 9 illustrates a protocol stack between a UE and a core network considered in NextGen.

FIG. 9 illustrates a protocol stack between a UE and a core network considered in NextGen.

Referring to FIG. 9, NG1 performs a function similar to a NAS protocol of an EPS and NG2 performs a function similar to an S1-AP of the EPS. An NG RRC and an NG access stratum (AS) correspond respectively to a legacy LTE RRC and a legacy LTE AS or correspond respectively to an NR RRC and an NR AS of new radio (NR) which is undergoing standardization. RRC in the two RATs supported in an NG system, i.e., RRC in both LTE and NR, is expected to be implemented based on current LTE RRC.

A basic session management framework and service continuity are under discussion through FS_NextGen study (see 3GPP TR 23.799). In regard to the session management framework and service continuity, for example, the following issues to be solved are under discussion.

Session management: The session management is responsible for the setup of the IP or non-IP traffic connectivity for the UE as well as managing the user plane for that connectivity.

Support for session and service continuity and efficient user plane path: In order to address the specific needs of different applications and services, the next generation system architecture for mobile networks should support different levels of data session continuity based on the Mobility on demand concept of the Mobility framework defined in service continuity. For example, the next generation system may do one of the following on per session basis for the same UE:

support session continuity;

not support session continuity;

support service continuity when session continuity is not provided.

For session and service continuity, the following solutions are included in the document of 3GPP TR 23.799 and it has been agreed that a basic session and service continuity (SSC) mode should be used. This solution provides a framework to support three distinct session and service continuity (SSC) modes in the NextGen system. The solution assumes a PDU session to exist between a UE and a user-plane function (called terminating user-plane function (TUPF)). The TUPF terminates the 3GPP user plane and interfaces with the data network. The TUPF terminates the 3GPP user plane and interfaces with the data network. It is not precluded that the TUPF can also be co-located with the access network, e.g. to enable stationary UE scenarios. The NextGen system shall support the following session and service continuity (SSC) modes:

SSC mode 1: The same TUPF is maintained regardless of the access technology (e.g. RATs and cells) a UE is using to access the network.

SSC mode 2: The same TUPF is only maintained across a subset (i.e. one or more, but not all) of the access network attachment points (e.g. cells and RATs), referred to as the serving area of the TUPF. When the UE leaves the serving area of a TUPF, the UE will be served by a different TUPF suitable for the UE's new point of attachment to the network. The serving area of a TUPF may also be limited to a single cell only, e.g. in case of stationary UEs.

SSC mode 3: In this mode the network allows the establishment of UE connectivity via a new TUPF to the same data network (DN) before connectivity between the UE and the previous TUPF is terminated. When trigger conditions apply, the network selects a target TUPF suitable for the UE's new point of attachment to the network. While both TUPFs are active, the UE either actively rebinds applications from the previous to the new address/prefix, or alternatively, the UE waits for flows bound to the previous address/prefix to end.

When requesting a PDU session, the UE may indicate the requested session and service continuity (SSC) mode as part of the PDU session setup signaling to the network. The serving network receives the list of supported SSC modes and the default SSC mode per data network per subscriber as part of the subscription information from the subscriber database. The serving network selects the SSC mode by either accepting the requested SSC mode or modifying the requested SSC mode based on subscription and/or local configuration. A serving network may be configured to modify the SSC mode requested by the UE for different reasons, e.g. the serving network may prefer to avoid SSC mode 1 for a specific data network to avoid concentrating traffic on centralized peering points with the related data network. If a UE does not provide an SSC mode when requesting a new PDU session, then the network selects the default SSC mode listed in the subscription (for the data network to connect to) or applies local configuration to select the SSC mode. After selecting the SSC mode, the network either (a) accepts the PDU session request from the UE and indicates the selected SSC mode to the UE, or (b) the network rejects the PDU session request and sends the selected SSC mode and a cause value to the UE indicating that the selected SSC mode is already used by another PDU session in the UE. SSC modes apply per PDU session. A UE may request different SSC modes for different PDU sessions, i.e. different PDU sessions which are active in parallel for the same UE may have different SSC modes. The SSC mode is not changed during the lifetime of a PDU session. When selecting the TUPF for a PDU session, the network takes the UE's current point of attachment and the requested SSC mode into account. It is not precluded that other information is also taken into account for TUPF selection.

For SSC mode 1, the following principles apply: The assigned TUPF is maintained during the lifetime of the PDU session, i.e. the TUPF is not changed by the network.

For SSC mode 2, the following principles apply:

Triggers for redirection to a different TUPF: The network decides whether the TUPF assigned to a UE's PDU session needs to be redirected based on UE mobility, local policies (e.g. information about the serving area of the assigned TUPF).

Redirection procedure: The network redirects the UE's traffic to a different TUPF by first releasing the user plane path associated with the current TUPF and then setting up a user plane path corresponding to a new TUPF. Two solution variants are described below, one where the PDU session is preserved when reallocating the TUPF and one where the network is disconnecting the UE's PDU session corresponding to the current TUPF and requesting the UE to reactivate the PDU session immediately which results in selection of a new TUPF.

During this process, the UE remains attached.

The network selects a TUPF based on the UE's current point of attachment to the network.

For SSC mode 3, the following principles apply:

Triggers for redirection to a different TUPF: The network decides whether the TUPF assigned to a UE's PDU session needs to be redirected based on local configuration (e.g. information about the serving area of the assigned TUPF).

Redirection procedure: The network indicates to the UE that traffic on one of the UE's active PDU sessions needs to be redirected. The network also starts a timer and indicates the timer value to the UE. The user plane path is established towards a new TUPF. Two solution variants are described below, one where the PDU session is re-used also for the additional user-plane path and one where an additional PDU session is established. The network selects a new TUPF based on the UE's current point of attachment to the network. It is not precluded that other information is also taken into account for TUPF selection. If the UE has sent a request for an additional PDU session to the same DN without a prior indication from the network that the active PDU session needs to be redirected, then the network rejects the UE's request.

Once the new user plane path associated with the new TUPF has been established, the UE may perform one of the following options:

Option 1: The UE actively redirects application flows bound to the previous TUPF to the new TUPF e.g. by using upper layer session continuity mechanisms. Once the UE has finished redirecting applications flows to the new TUPF, the previous TUPF is released.

Option 2: The UE steers new application flows to the new TUPF. Existing flows via the previous TUPF continue until the flows terminate. Once all flows using the previous TUPF have ended, the previous TUPF is released.

When Option 2 is used, Multi-homed PDU session may be used to send application flows bound to the previous TUPF. Tunnel between the previous TUPF and new TUPF is used to forward those flows.

If the previous TUPF has not been released when the timer expires, or alternatively if the network detects inactivity on the previous TUPF, the network releases the previous TUPF.

Figure 10:
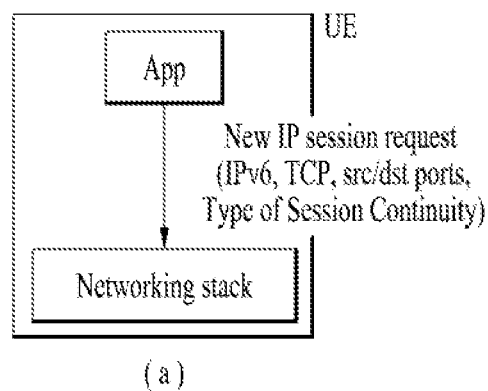
FIG. 10 illustrates methods of determining a session and service continuity (SSC) mode.
Figure 10:
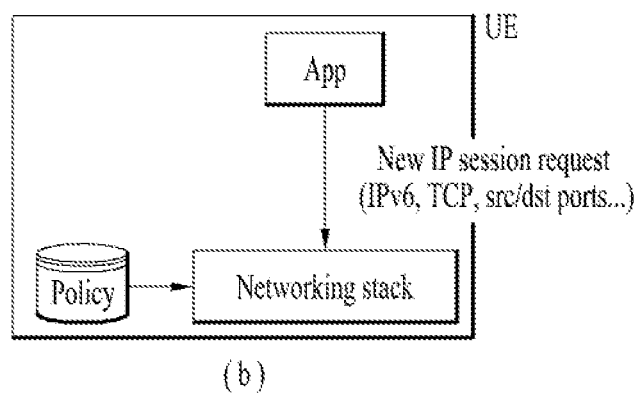

FIG. 10 illustrates methods of determining a session and service continuity (SSC) mode.

A UE may determine an SSC mode necessary for an application using one of the following methods:

1. The app that starts a new flow (i.e. opens a new socket) indicates the type of session continuity required by this flow as shown in FIG. 10(*a*). This may be indicated by using the sockets API extensions specified in RFC 3493, RFC 3542 and in draft-ietf-dmm-ondemand-mobility. In other words, the app may use already specified software APIs to indicate what type of session continuity is required. For example, if the app requests a socket with a nomadic IP address, essentially, the app requests SSC mode 2. If the app requests a socket with a fixed IP address or a sustained IP address, essentially, the app requests SSC mode 1 or SSC mode 3 respectively. The definition of nomadic, sustained and fixed IP address can be found in draft-ietf-dmm-ondemand-mobilit.

2. If the app that starts a flow does not indicate the type of required session continuity, the UE may determine the required session continuity by using provisioned policy, as shown in FIG. 10(b). The policy contains a list of prioritized rules and each rule indicates the required SSC mode for entire applications or specific flow types. For example, the policy in the UE may contain the following rules:

Rule 1, priority 1: App=com.example.skype, Required continuity type=SSC mode 3.
Rule 2, priority 2: App=com.example.web.server, Required continuity type=SSC mode 1.
Rule 3, priority 3: Protocol=TCP; DstPort=80, Required continuity type=SSC mode 2.
Default rule: Default continuity type=SSC mode 2.

When the UE attempts to establish a PDU session before receiving a request from an application (e.g. during the initial attach), or the application does not request an SSC mode, or the UE does not have a policy for the specific application, then the UE cannot determine an SSC mode as defined above. In this case:

If the UE is provisioned with a default SSC mode (e.g. as part of the policy shown in FIG. 10(b)), then the UE requests the PDU session with the default SSC mode. The default SSC mode can be one of the three SSC modes discussed in the previous clause. For example, a fixed IoT sensor or even a smartphone may be provisioned with default SSC mode 2.

If the UE is not provisioned with a default SSC mode, then the UE requests the PDU session without providing an SSC mode. In this case, the network determines the SSC mode of the PDU session (e.g. based on subscription data and/or network policy) and provides the selected mode back to the UE.

FS_NextGen study is discussing interworking and migration with an EPC, which is a legacy system, as well as a next-generation core (NGC), which is a new 5G system.

For reference, when a UE moves from a legacy EPS to another RAT, an inter-RAT handover procedure (e.g., see Section 5.5.2.2 of 3GPP TS 23.401 V13.8.0) is performed. An EPS manages quality of service (QoS) in units of a bearer. That is, various QoS parameters of a bearer within a PDN connection used by the UE may be distinguished based on a policy or determination of a network. QoS may be applied through a traffic flow template (TFT) of a PDN GW and the UE and corresponding traffic is allocated to a proper bearer through a packet filter (e.g., see Section "5.4.1 Dedicated bearer activation" and Section "5.4.2 Bearer modification with bearer QoS update" of 3GPP TS 23.401). For example, if the packet filter is configured with the condition "if (destination IP=10.10.10.10)→bearer #2", traffic having a destination IP of 10.10.10.10 is allocated to bearer #2 according to the condition of the packet filter and QoS of the bearer is applied to the traffic. An EPS bearer is realized by the following elements:

In the UE, the UL TFT maps a traffic flow aggregate to an EPS bearer in the uplink direction;
In the PDN GW, the DL TFT maps a traffic flow aggregate to an EPS bearer in the downlink direction;
A radio bearer (defined in 3GPP TS 36.300) transports the packets of an EPS bearer between a UE and an eNB. If a radio bearer exists, there is a one-to-one mapping between an EPS bearer and this radio bearer;
An S1 bearer transports the packets of an EPS bearer between an eNB and a Serving GW;
An E-UTRAN Radio Access Bearer (E-RAB) refers to the concatenation of an S1 bearer and the corresponding radio bearer, as defined in 3GPP TS 36.300;
An S5/S8 bearer transports the packets of an EPS bearer between a Serving GW and a PDN GW;
A UE stores a mapping between an uplink packet filter and a radio bearer to create the mapping between a traffic flow aggregate and a radio bearer in the uplink;
A PDN GW stores a mapping between a downlink packet filter and an S5/S8 bearer to create the mapping between a traffic flow aggregate and an S5/S8 bearer in the downlink;
An eNB stores a one-to-one mapping between a radio bearer and an S1 Bearer to create the mapping between a radio bearer and an S1 bearer in both the uplink and downlink;
A Serving GW stores a one-to-one mapping between an S1 Bearer and an S5/S8 bearer to create the mapping between an S1 bearer and an S5/S8 bearer in both the uplink and downlink.

The PDN GW routes downlink packets to the different EPS bearers based on the downlink packet filters in the TFTs assigned to the EPS bearers in the PDN connection. Upon reception of a downlink data packet, the PDN GW evaluates for a match, first the downlink packet filter that has the lowest evaluation precedence index and, if no match is found, proceeds with the evaluation of downlink packet filters in increasing order of their evaluation precedence index. This procedure is executed until a match is found, in which case the downlink data packet is tunneled to the Serving GW on the EPS bearer that is associated with the TFT of the matching downlink packet filter. If no match is found, the downlink data packet is sent via the EPS bearer that does not have any TFT assigned. If all EPS bearers (including the default EPS bearer for that PDN) have been assigned a TFT, the PDN GW discards the downlink data packet.

In a legacy EPS, if a bearer satisfying a currently required QoS level is not present, the UE or the network updates QoS of a currently generated bearer or generates a new dedicated bearer.

Figure 11:
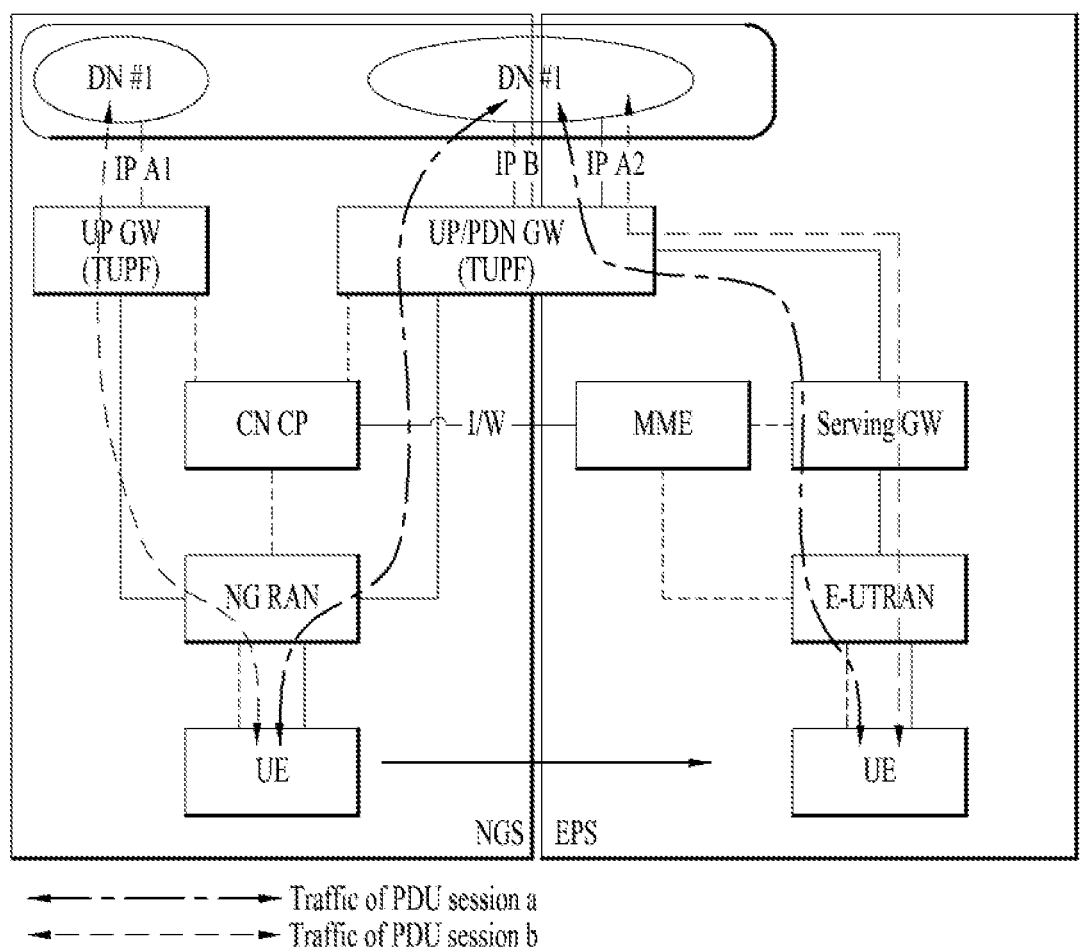
FIG. 11 illustrates an intersystem change scenario from an NGC to an EPC.

FIG. 11 illustrates an intersystem change scenario from an NGC to an EPC.

In an EPS, it was impossible to establish two or more PDN connections to the same APN, except for PDN connections according to an IP version (e.g., one connection for IPv4 and one connection for IPv6). For example, the EPS does not permit establishing two PDN connections for IPv4 to the same APN. However, according to the current NextGen study, in an NGS, multiple PDU sessions may be configured and used with respect to the same data network name (DNN) or APN according to a scenario such as edge computing, multi-homing, or network slicing (see agreements for "multi-homed PDU sessions" in Section 8.4 of 3GPP TR 23.799 V1.2.0).

When a UE with two or more PDU sessions for the same data network (DN) performs intersystem change to the EPS, the operation of intersystem change may vary according to various interworking options. However, if intersystem change occurs in a manner similar to EPS-UMTS handover rather than a detach/re-attach procedure, the following scenarios may be considered.

Referring to FIG. 11, in the NGS, the UE may have two or more PDU sessions. Among the PDU sessions, two or more PDU sessions may be PDU sessions for the same DN, i.e., PDU sessions having the same DNN, (PDU session a and PDU session b of FIG. 11). Such a situation may be a scenario such as connection to a local network for edge computing, multi-homing, or a scenario such as DN allocation per service according to application of network slicing, or may occur while the UE is simultaneously connected to two or more network slices. The UE may require system change to the EPS due to mobility or for a reason according to a service (e.g., fallback for VoLTE call). IP preservation, service continuity, etc. are determined during intersystem change according to an SSC mode of a currently created PDU session.

For example, a PDU session with SSC mode 1 may be connected to a common terminating user plane function (TUPF) regardless of a system to preserve an IP address and configure complete continuity. Herein, this is achieved on the premise that the TURF in the NGS and a P-GW of the EPS are equal. For PDU sessions with SSC mode 2 and SSC mode 3, connection to a new IP anchor and allocation of a new IP address are needed during system change. However, PDU sessions connected to the same DN, to which different PDN addresses (e.g., IP addresses) have been allocated in the NGS, should be connected to the same IP address in the EPS. That is, two PDU sessions having two IP addresses can use only one IP address while moving to the EPS so that a problem arises. In other words, due to a problem generated when a plurality of PDU session features for one DN supported in the NGC is not supported in the EPS, since the UE should forcibly discard or should reestablish connection which is not handed over from one system to another system in such a scenario, delay or additional signaling occurs in this procedure.

The present invention intends to propose an operation of maintaining a session or rapidly switching sessions during intersystem change from the NGC to the EPC. In other words, the present invention intends to propose a method of efficiently configuring a PDU session during intersystem change in a mobile communication system such as a 3GPP EPS or a 3GPP NGS.

<Method 1. Control plane assisted intersystem handover with multiple PDU sessions to a single DN>

A UE that has been connected to the NGC may have two or more PDU sessions for the same DN. In this case, the following combinations may exist according to an SSC mode of each session.

- A session with SSC mode 1 is connected to the DN through an anchor TUPF. When one operator operates both an EPS and an NGS, the anchor TUPF is connected to both the EPS and the NGS.
- A session with SSC mode 2 or SSC mode 3 is connected to a TURF used only within the NGS.

1-1. Priority between PDU Sessions according to SSC Mode

When two PDU sessions are activated for a current specific DN, the following cases may be present.

Case 1. Two Sessions are all SSC Mode 1.
Case 2. One session is SSC mode 1 and the other session is SSC mode 2 or SSC mode 3.
Case 3. Two sessions are all SSC mode 2 or SSC mode 3.

In each case, a primary PDU session having a higher priority among two or more sessions and the other secondary PDU session(s) may be determined. Criteria are as follows.

In Case 2, the session with SSC mode 1 has a higher priority. In Case 1 and Case 3, the UE and the network may select a session which should be processed first or a more important session, by various criteria, among sessions having the same SSC mode. This information may be memorized in the UE and a memory of the network. For example, a PDU session which has been established first after the UE attaches to the network may have the highest priority. Alternatively, a session in which the least service interruption should occur according to a service characteristic of the UE (e.g., a session for urgent communication) may have the highest priority.

1-2. Case in which Multiple PDU Sessions Move

A session of SSC mode 1 may perform intersystem change while satisfying SSC if the EPC and the NGC are equal to a user plane (UP) GW or P-GW. In this case, a DNN of an NGS is equal to an APN of an EPS and the P-GW or the UP GW is an anchor point. An IP address of a PDU session having SSC mode 1 may be maintained without change. Naturally, the PDU session is changed to a PDN connection of the EPC to provide a seamless service. This procedure may be performed similarly to a legacy intersystem handover procedure between the UMTS and the EPS (see Section 5.5.2.2 of 3GPP TS 23.401).

If a PDU session having SSC mode 1 is further present or a PDU session having another SSC mode is further present, a plurality of connections to the same DN should be changed to one connection as pointed out above. In this case, as proposed in 1-1, a primary PDU session having a high priority may be distinguished. The primary PDU session may be handed over to the EPC from the NGC while maintaining SSC through an operation similar to legacy intersystem change. Then, PDN connection A may be generated.

Since a secondary PDU session has the same DN, an additional PDN connection cannot be generated in the EPC. Instead, for a service which has been provided using the secondary PDU session, a dedicated bearer to which QoS is allocated according to characteristics or requirements of the service may be generated in PDN connection A and the UE may receive the service distinguished from other sessions, using the dedicated bearer. If QoS requirements are acceptable in a default bearer of a currently generated PDN connection, the UE may receive the service which has been provided using the secondary PDU session through the default bearer without allocating an additional dedicated bearer.

In other words, in order to hand over the primary PDU session of the NGC to the EPC, a PDN connection is established in the EPC and the secondary PDU session of the NCG is handed over to a bearer in the PDN connection.

To this end, the NGC and the EPC may exchange the following information while exchanging information for intersystem change.

- A PDU session (ID) to be moved during intersystem change, an IP address (only when the primary session is SSC mode 1) and an SSC mode of the PDU session, and DN(N)
- A PDU session (ID) having the highest priority when multiple PDU sessions are connected to the same DN
- A QoS value or an index value of each PDU session (e.g., a 5G QoS identifier, QCI, etc.)

To this end, two core network (CN) functions may have mapping (QoS of DNN-APN or NGC or QoS of EPC) information of related information.

When multiple PDU sessions are moved, in order to move a primary session having a high priority, the EPC first generates a PDN connection and then moves the PDU session. Next, the following operation may be performed for a secondary PDU session.

An MME transmits a request for creating a new dedicated bearer to the P-GW when a PDN connection to a corresponding DN is generated. The request may include an APN and a required QoS and further include parameters for interworking with the NGC. The P-GW performs dedicated bearer activation based on the request. This procedure started from the MME may be regarded as MME initiated dedicated bearer activation.

If the dedicated bearer is successfully set up, the MME indicates handover for the second session (i.e., secondary session) to an NGC core network control plane (CN-CP) or an E-UTRAN. Since an IP address of the secondary session is actually changed, the secondary session cannot maintain session continuity. If a session is SSC mode 1, service continuity can be guaranteed by maintaining seamless ongoing data traffic through data forwarding between a session for an old IP and a session for a new IP in the P-GW. If a session is SSC mode 2/3, the session may be temporarily deactivated because a UP GW is changed and an IP address is also changed. However, as proposed above, if the dedicated bearer is previously generated and intersystem change is performed in a preparation step, a period during which interruption is generated due to system change may be minimized.

If an IP address for the secondary session is newly allocated, the UE should allocate the new IP address to a flow of transmitting/receiving data through the secondary session in the NGC. In the present invention, since the secondary session is mapped to a default bearer or a dedicated bearer within a PDN connection for the primary session, the UE indicates a new IP address for a service which has used the secondary session, i.e., an IP address of the PDN connection corresponding to the primary session, during intersystem change. This operation occurs in the interior of the UE. Since a layer actually using an IP address assigned to each session is a higher layer, an IP address of the primary session to be newly allocated to the higher layer (e.g., IP layer) which has used the secondary session of the UE is indicated and then the higher layer may process flows which have used the secondary session, using the IP of the primary session, so that traffic which has used the primary session is transmitted to the primary session.

If there is no session having SSC mode 1, a PDN connection is newly generated for the primary session. In this case, SSC cannot be guaranteed. An operation after the PDN connection is generated for the primary session is as described above. In this case, when a source CN-CP provides information to an MME, the IP address of the primary session need not be provided.

When a session is SSC mode 1, since a PDN connection should be established while preserving an IP address, the source CN-CP or the MME provides the IP address of the primary PDU to the S-GW/P-GW. When a session is not SSC mode 1, the IP address is not needed and thus the IP address of the primary PDU session need not be provided to the S-GW/P-GW. When the primary session is not SSC1, the IP address is not maintained and the MME may newly establish the PDN connection by allocating a new IP.

Figure 12:
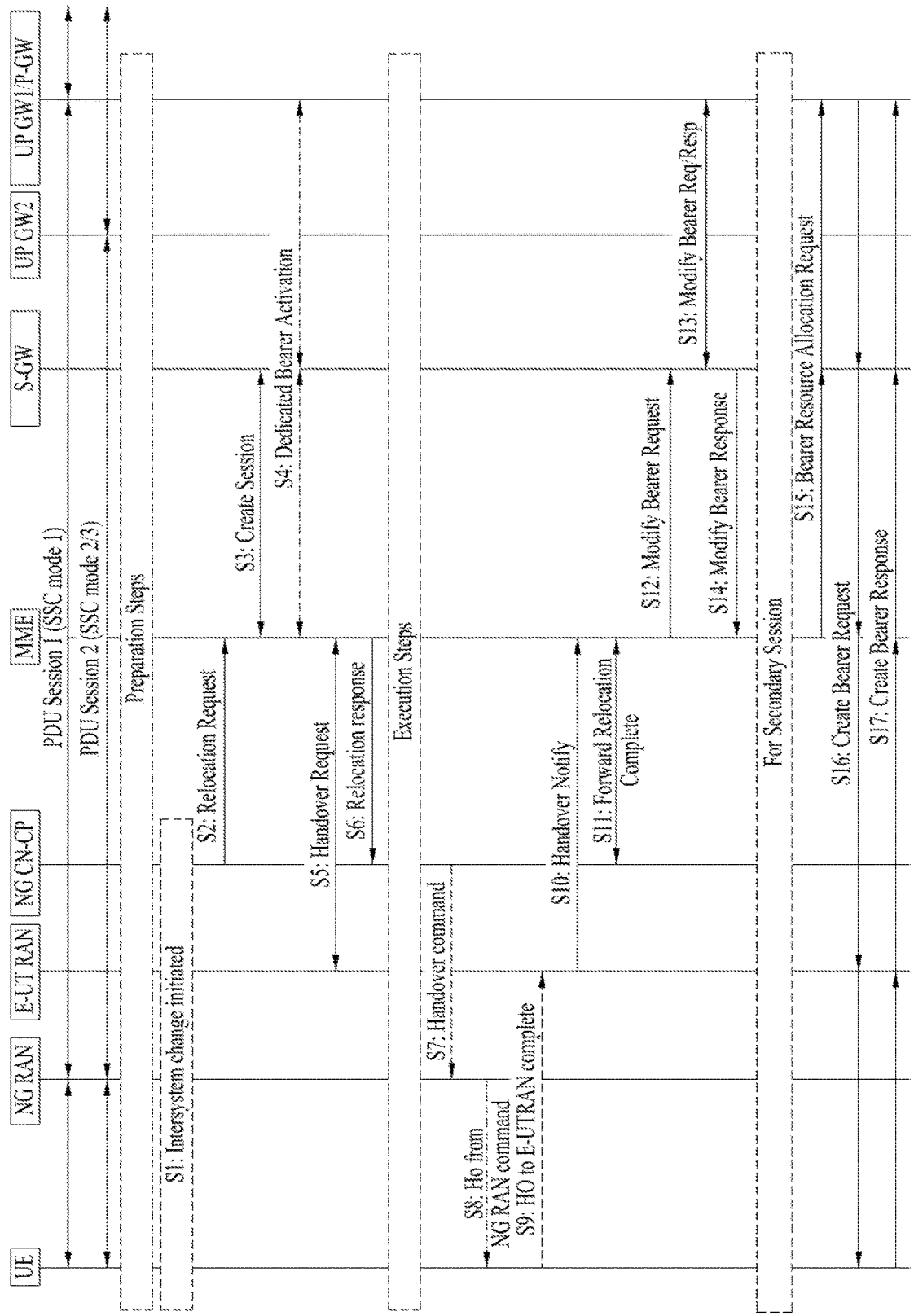
FIG. 12 illustrates an intersystem handover procedure according to the present invention.
Figure 13:
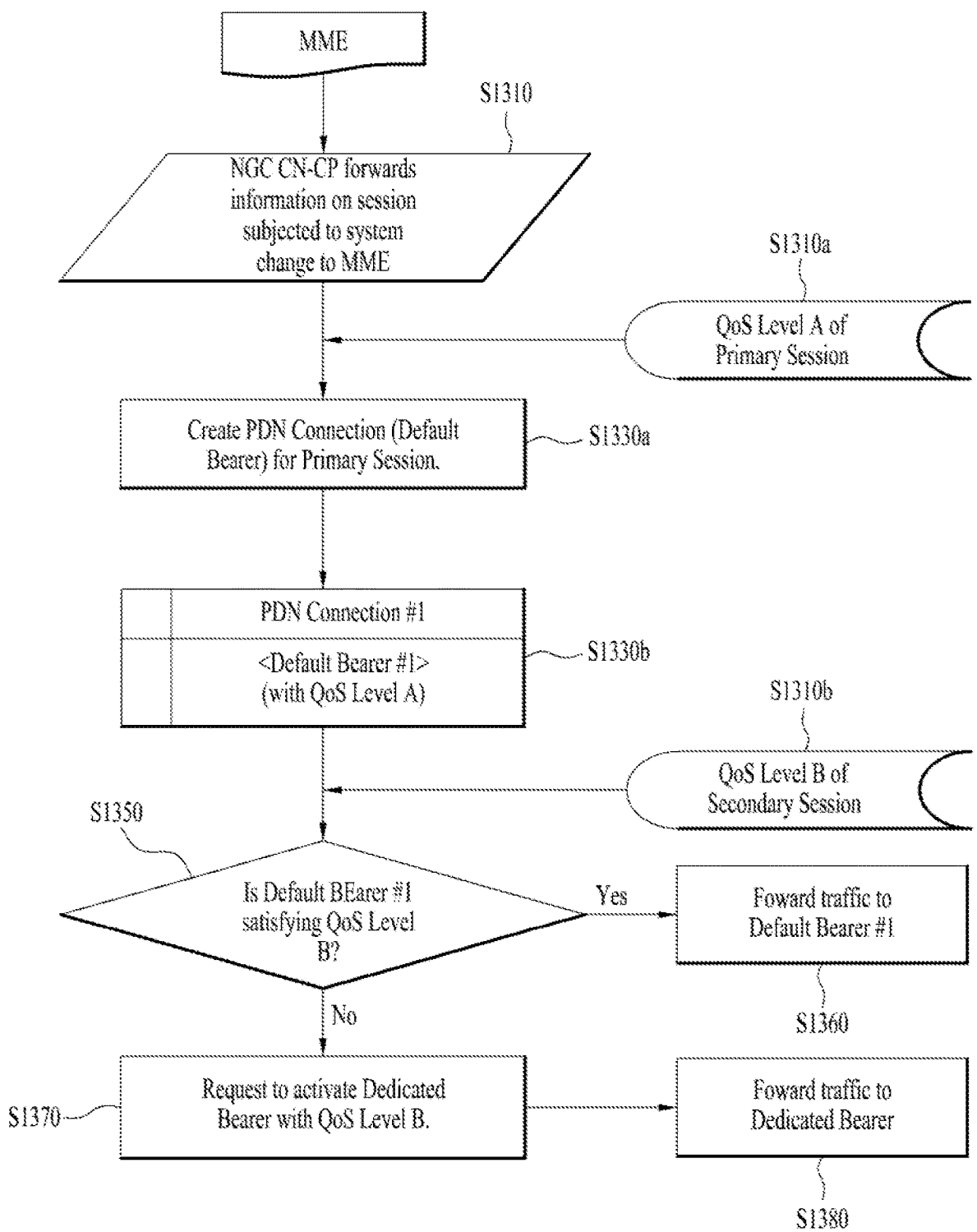
FIG. 13 illustrates a flowchart for determining to which bearer of an EPC traffic using a secondary session of an NGC should hand over according to an embodiment of the present invention.

FIG. 12 illustrates an intersystem handover procedure according to the present invention. FIG. 13 illustrates a flowchart for determining to which bearer of an EPC traffic using a secondary session of an NGC should hand over according to an embodiment of the present invention. The present invention will now be described with reference to FIGS. 12 and 13. For steps corresponding to the prior art among steps which are not described in detail in FIG. 12, refer to Section 5.5.2.2.2 and 5.5.2.2.3 of 3GPP TS 23.401.

S0. The UE currently has two PDU sessions, i.e., a PDU session with SSC mode 1 and a PDU session with SSC mode 2 or 3. The two sessions are connected to the same DN.

S1. Intersystem change occurs from the NGC to the EPC. This may be caused by cell change, i.e., mobility, or caused by change according to a service characteristic (e.g., EPC fallback for a voice call service).

S2. A CN-CP of the NGC transmits Relocation Request to an MME of the EPC. The values proposed in 1-1 and 1-2 including information about PDU session(s) to be handed over to the EPC by the NGC may be included in Relocation Request (S1310, S1310*a*, and S1310*b* of FIG. 13).

S3. Since a service GW is changed, the MME transmits a Create Session Request to the S-GW/P-GW of the EPC (see "Create Session Request" and "Create Session Response" of 3GPP TS 23.401). In this case, information about a primary PDU session having a high priority may be transmitted in Create Session Request. In other words, the MME may determine whether to request a default bearer of a PDN connection or a dedicated bearer having new QoS, based on the information received from the NG-CN and then may include the determined bearer in Create Session Request. In this step, it can be said that the PDN connection has been established.

S4. When multiple PDU sessions have been connected to the same DN, an additional dedicated bearer may be requested for a service in the EPC (S1370 of FIG. 13). This operation may be performed after this step or handover is ended. If the dedicated bearer is established in this step, information for the dedicated bearer may be transmitted to the S-GW/P-GW in this step. In this case, the dedicated bearer may be established based on the information.

S5 to S11. Similarly to conventional intersystem handover, handover between RAT nodes may be performed. However, in intersystem change due to service change, if a RAN is not changed, RAN handover execution (S5, S8, and S9) in this operation may not be performed.

S12 to S14. If handover is terminated, the MME performs a Modify Bearer procedure with respect to the S-GW and the P-GW. In this step, since handover of the RAN is ended, Modify Bearer Request functions to cause the MME to indicate, to the P-GW, that UE can receive data through a new RAN. After this procedure, a PDU connection established in S3 may be used. In other words, after S14, the UE may continue to receive a service of the primary PDU session of the NGC through PDN connection of the EPC (established in S3) (S1330*a* and S1330*b* of FIG. 13). If the dedicated bearer is generated in step S4 (S1370 of FIG. 13), the UE may receive a service of other PDU session(s) as well as the primary PDU session after this procedure (S1380 of FIG. 13).

S15. If the dedicated bearer is not generated in step S4, the MME may transmit Bearer Resource Allocation Request to the P-GW (S1370 of FIG. 13). In this case, information such as a PDU session, an APN, and a QoS level may be included in the Bearer Resource Allocation Request message. If a default bearer of current PDN connection satisfies a demanded QoS level (S1350 of FIG. 13, Yes), this procedure may be omitted. In this case, traffic of the secondary session of the NCG may be transmitted to the default bearer (S1360 of FIG. 13). Steps S16 and S17 are the same as a PDN GW initiated dedicated bearer activation procedure defined in a current EPS. Notably, triggering of dedicated bearer activation (see "Dedicated bearer activation" of Section 5.4.1 of 3GPP TS 23.401) is the Bearer Resource Allocation Request message transmitted by the MME in step S15 and the dedicated bearer is established based on information included in the Bearer Resource Allocation Request message. In other words, according to the present invention, dedicated bearer activation may be triggered by the MME. Traffic of the secondary session is forwarded to the dedicated bearer (S1380 of FIG. 13).

In the present invention, in addition to information included in the existing relocation request message in step S2 of FIG. 12 (see "Relocation Request of 3GPP TS 23.401), the above parameters mentioned in 1-1 of the present invention may be included in the relocation request message. In the legacy EPC, a UE, a P-GW, or an HSS has initiated or requested bearer creation and the MME has not initiated or requested bearer creation. In contrast, according to the present invention, the MME receiving a plurality of PDU sessions from the NGC requests that the S-GW or the P-GW create a bearer for traffic using the secondary session or activate the bearer to aid fast intersystem change to the EPC from the NGC. This operation may be performed in step S4 or S15 of FIG. 12.

FIG. 13 illustrates a procedure of determining to which bearer of the EPS traffic that has used the secondary session in the NGS in step 4 or 15 of FIG. 12 will be handed over, that is, a procedure of determining whether a PDN connection generated in the EPS will use a default bearer or a new dedicated bearer for the primary session.

Referring to FIG. 13, an NGC CN-CP forwards information on a session subjected to system change to an MME (S1310). For example, the NGC CN-CP may inform the MME of a QoS level (e.g., QoS level A) of a primary session (S1310a). Since a serving GW is changed due to intersystem change, the MME may transmit Create Session Request to the S-GW and information about the primary PDU session having a high priority may be transmitted in Create Session Request. While the UE is using a plurality of PDU sessions connected to the same DN in the NGC, the NGC CN-CP forwards not only the information about the primary PDU session having a high priority but also information about session(s) of the next priority, i.e., the secondary PDU session(s), to the MME (S1310). For example, the NGC CN-CP may inform the MME of a QoS level (e.g., QoS level B) of the secondary session (S1310b). PDN connection may be established between the UE and a PDN based on the information about the primary PDU session (S1330a) and default bearer #1 having QoS level A may be simultaneously generated (S1330b). If default bearer #1 satisfies a QoS level demanded by traffic of the secondary PDU session in the NGC (S1350, Yes), traffic of the secondary PDU session is forwarded to default bearer #1 (S1360). If default bearer #1 does not satisfy the QoS level demanded by traffic of the secondary PDU session (S1350, No), the MME forwards a dedicated bearer activation request to the S-GW or the P-GW to perform a dedicated bearer activation procedure (S4 of FIG. 12) or forwards a bearer resource allocation request to the S-GW or the P-GW to trigger creation of a dedicated bearer (S15 of FIG. 12).

<Method 2. UE provided intersystem handover with multiple PDU sessions to a single DN>

The UE that has connected to the NGC may have one PDU session or two or more PDU sessions for the same DN. In this case, the following combinations may exist according to an SSC mode of each session.

A session having SSC mode 1 is connected to the DN through an anchor TUPF. When one operator operates both an EPS and an NGS, the anchor TUPF is connected to both the EPS and the NGS.

A session having SSC mode 2 or SSC mode 3 is connected to a TURF used only within the NGS.

2-1. Priority between PDU Sessions According to SSC Mode

When two PDU sessions are activated for a current specific DN, the following cases may be present.

Case 1. Two sessions are all SSC mode 1.
Case 2. One session is SSC mode 1 and the other session is SSC mode 2 or SSC mode 3.
Case 3. Two sessions are all SSC mode 2 or SSC mode 3.

In each case, a primary PDU session having a higher priority among two or more sessions and the other secondary PDU session(s) may be determined. Criteria are as follows.

In Case 2, the session with SSC mode 1 has a higher priority. In Case 1 and Case 3, the UE and the network may select a session which should be processed first or a more important session, by various criteria, among sessions having the same SSC mode. This information may be memorized through the UE and a memory of the network. For example, a PDU session which has been established first after the UE attaches to the network may have the highest priority. Alternatively, a session in which the least service interruption should occur according to a service characteristic of the UE (e.g., a session for urgent communication) may have the highest priority.

2-2. Case in which Multiple PDU Sessions Move

A session of SSC mode 1 may perform intersystem change while satisfying SSC if the EPC and the NGC are equal to a user plane (UP) GW or P-GW. In this case, a DNN of an NGS is equal to an APN of an EPS and the P-GW or the UP GW is an anchor point. An IP address of a PDU session having SSC mode 1 may be maintained without change. Naturally, the PDU session is changed to a PDN connection of the EPC to provide a seamless service. This procedure may be performed similarly to a legacy intersystem handover procedure between the UMTS and the EPS (see Section 5.5.2.2 of 3GPP TS 23.401).

If a PDU session having SSC mode 1 is further present or a PDU session having another SSC mode is further present, a plurality of connections to the same DN should be changed to one connection as pointed out above. In this case, as proposed in 1-1, a primary PDU session having a high priority may be distinguished. The primary PDU session may be handed over to the EPC from the NGC while maintaining SSC through an operation similar to legacy intersystem change. Then, PDN connection A may be generated.

Since a secondary PDU session has the same DN, an additional PDN connection cannot be generated in the EPC. Instead, for a service which has been provided using the secondary PDU session, a dedicated bearer to which QoS is allocated according to characteristics or requirements of the service may be generated in PDN connection A and the UE may receive the service distinguished from other sessions, using the dedicated bearer. If QoS requirements are acceptable in a default bearer of a currently generated PDN connection, the UE may receive the service which has been provided using the secondary PDU session through the default bearer without allocating an additional dedicated bearer.

Since all sessions except for the primary PDU session with SSC mode 1 should be mapped to the dedicated bearer or the default bearer through a new IP address (for the primary PDU session), there are a method of performing seamless handover and a method of performing deactivation with reactivation. Hereinafter, the latter, i.e., the method of performing deactivation with reactivation, will be proposed.

When a UE should change systems due to service change or mobility, the UE selects the primary PDU session which is to be handed over first as mentioned in 2-1. Information of the primary PDU session is stored in the memory of the UE. This information may be as follows.

- An APN, IP address information, etc. of a PDU session (ID) having the highest priority when multiple PDU sessions are connected to the same DN
- A PDU session (ID) to be moved during intersystem change and a DN(N) thereof
- A QoS value or an index value of each PDU session (e.g., a 5G QoS identifier, QCI, etc.))

Next, the UE deactivates all other sessions (hereinafter, secondary PDU session(s)) except for the primary PDU session. However, since the secondary PDU session(s) are sessions that should be reactivated, the UE stores information regarding the secondary PDU session(s). This information regarding the secondary PDU session(s) including the above-described information (i.e., a PDU session having a high priority, a PDU session to be changed during intersystem change, QoS of each PDU session, etc.) should be shared between a protocol stack for the NGS and a stack for the EPS.

The network and the UE perform an intersystem change procedure based on the primary PDU session which remains without being deactivated. This procedure may be performed similarly to an inter-RAT handover procedure described in 3GPP TS 23.401.

If handover to the EPS is ended, the UE transmits a bearer resource allocation request to the MME prior to entering an idle mode. The MME forwards the bearer resource allocation request to the P-GW. In this case, the UE may include the previously stored information (e.g., an APN, an IP address, etc.) of the primary PDU session and information (e.g., QoS) of previously used session(s) in the bearer resource allocation request message. Alternatively, the bearer resource allocation request may be included in information indicating which is required for an intersystem change procedure. The P-GW performs dedicated bearer activation based on a QoS value requested by the UE or additional information. Herein, the IP address is transmitted only when the primary PDU session is SSC mode 1. If the primary session is not SSC mode 1, the IP address is not maintained and the MME may newly establish a PDN connection by allocating a new IP.

If there is no single session having SSC mode 1, a PDN connection should be newly generated for the primary session. In this case, SSC cannot be guaranteed. An operation after the PDN connection is generated for the primary session is as described above.

When a session is SSC mode 1, since a PDN connection should be established while preserving an IP address, the UE provides the IP address of the primary PDU. When a session is not SSC mode 1, the IP address is not needed and thus the IP address of the primary PDU session need not be provided.

Figure 14:
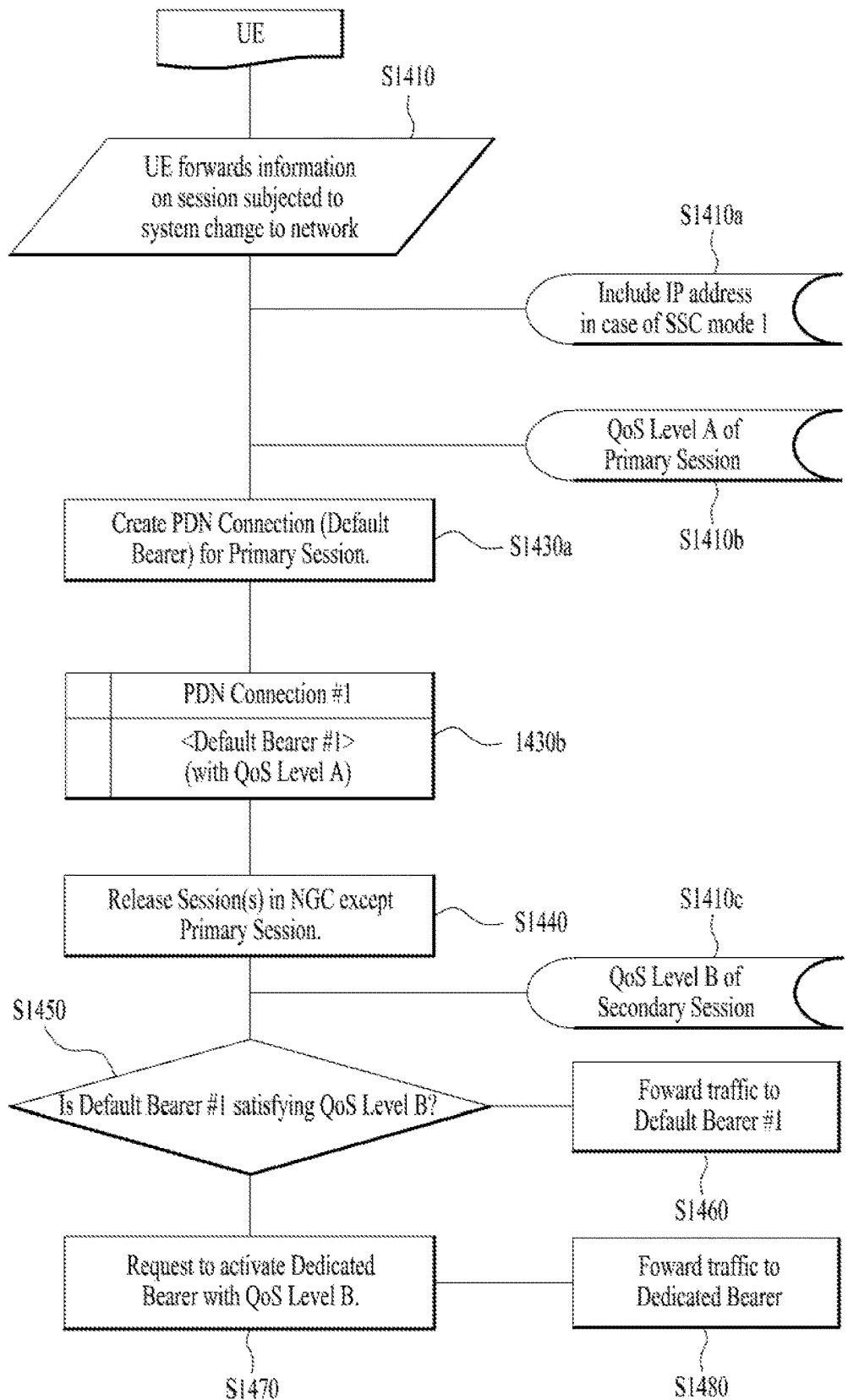
FIG. 14 illustrates a flowchart for determining to which bearer of an EPC traffic using a secondary session of an NGC should hand over according to another embodiment of the present invention.

FIG. 14 illustrates a flowchart for determining to which bearer of an EPC traffic using a secondary session of an NGC should hand over according to another embodiment of the present invention. The present invention will now be described with reference to FIGS. 12 and 14.

- S0. The UE currently has two PDU sessions, i.e., a PDU session with SSC mode 1 and a PDU session with SSC mode 2 or 3. The two sessions are connected to the same DN.
- S1. Intersystem change occurs from an NGC to an EPC. This may be caused by cell change, i.e., mobility, or caused by change according to a service characteristic (e.g., EPC fallback for a voice call service). In this case, the UE may inform an NG RAN of a primary PDU session together with an intersystem request (S1410, S1410a, and S1410b of FIG. 14) and the NG RAN may inform an NG CN-CP of this information. This may be implemented by a scheme including an ID or an index value of a corresponding session. After this operation, for sessions except for the primary PDU session, PDU session deactivation of step S6 may be performed at any time. In other words, S6, which is a procedure of releasing sessions for the same DN except for the session specified in S1, may be performed at any time after S1 is performed.
- S2. The CN-CP of the NGC transmits Relocation Request to an MME of the EPC. Only a primary PDU session is handed over to the EPS from NGS through relocation.
- S3. Since a service GW is changed, the MME transmits a Create Session Request to an S-GW/P-GW.
- S4 and S5. Similarly to conventional intersystem handover, handover between RAT nodes may be performed. However, in intersystem change due to service change, if a RAN is not changed, a radio related operation (S5) in this operation may not be performed.
- S6. When multiple PDU sessions have been connected to the same DN, PDU sessions except for the primary PDU session indicated in step S1 are deactivated (S1440 of FIG. 14). Herein, QoS information of each session and connection information of the primary PDU session (e.g., an APN or an IP address) are stored in the UE. This procedure may be performed at any time after S1 is performed.
- S7 to S11. Similarly to conventional intersystem handover, handover between RAT nodes may be performed. However, in intersystem change due to service change, if a RAN is not changed, RAN handover execution (S8, and S9) in this operation may not be performed.
- S12 to S14. If handover is terminated, the MME performs a Modify Bearer procedure with respect to the S-GW and the P-GW. The MME may be aware that handover has been ended through handover notification at the RAN and a forward relocation complete procedure with a source CN (NG CN-CP). After this procedure, the UE may continue to receive a service of the primary PDU session of the NGC through PDN connection (S1430a and S1430b of FIG. 14).
- S15. The UE may transmit UE initiated Bearer Resource Allocation Request (S1470 of FIG. 14). In this case, information such as a PDU session, an APN, a QoS level, etc. may be included in the bearer resource allocation request message (S1410c of FIG. 14). Next, the P-GW compares a requested QoS value with a corresponding PDN connection (S1450 of FIG. 14) and generates a new dedicated bearer to provide a service (S1470 and S1480 of FIG. 14) or provides a service to the UE through a bearer of existing PDN connection (S1460 of FIG. 14).

Unlike Method 1 in which the MME determines whether to create the dedicated bearer, the UE determines whether to create the dedicated bearer in the intersystem change procedure of Method 2. FIG. 14 illustrates a procedure of determining to which bearer of the EPS traffic using a session other than a primary session is handed over, i.e., a procedure of determining whether to use a bearer of a PDN connection generated in the EPS or a new dedicated bearer, for the primary session of the NGS.

Referring to FIG. 14, the UE transmits information on a session subjected to system change to a network (S1410). For example, the UE may inform the network of a QoS level (e.g., QoS level A) of a primary session (S1410b). If the primary session is SSC mode 1, the UE may also inform the network of an IP address (S1410a). Since a serving GW is changed due to intersystem change, an MME transmits Create Session Request to the S-GW. PDN connection is established between the UE and a PDN based on information about the primary PDU session (S1430a) and default bearer #1 having QoS level A may be simultaneously generated (S1430b). When multiple PDU sessions for the same DN are present, PDU sessions except for the primary PDU session indicated in step S1 are deactivated (S1440 of FIG. 14). If the UE is using a plurality of PDU sessions connected to the same DN in an NGC, the UE stores not only the information about the primary PDU session having a high priority but also information about session(s) of the next priority, i.e., secondary PDU session(s), (S1410c). For example, the UE may store a QoS level (e.g., QoS level B) of the secondary session(s) (S1410c). If default bearer #1 satisfies a QoS level demanded by traffic of the secondary PDU session(s) in the NGC (S1450, Yes), traffic of the secondary PDU session(s) is transmitted to default bearer #1 (S1460). If default bearer #1 does not satisfy the QoS level demanded by traffic of the secondary PDU session(s) in the NGC (S1450, No), the UE triggers creation of a dedicated bearer by transmitting a UE initiated bearer resource allocation request (S15 of FIG. 12). The UE may include the information (e.g., QoS level) of the secondary session(s) requiring dedicated bearer configuration in the bearer resource allocation request message.

According to the present invention, a problem of session drop caused by difference in session characteristics between two systems when there is movement in a next-generation core network and an evolved packet core can be solved and an interruption time can be minimized.

Figure 15:
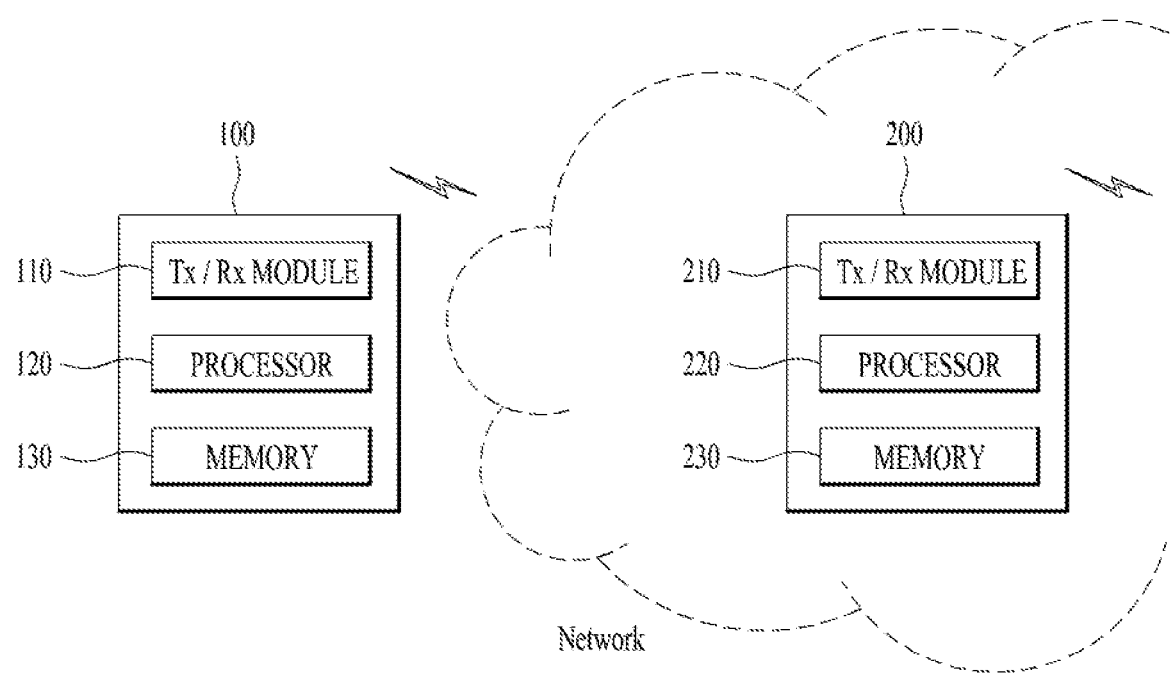
FIG. 15 illustrates a node device applied to the suggestion of the present invention.

FIG. 15 illustrates configuration of a UE and a network node according to a preferred embodiment of the present invention.

The UE 100 according to the present invention may include a transmission/reception (Tx/Rx) module 110, a processor 120, and a memory 130. The Tx/Rx module 110 may be referred to as a radio frequency (RF) unit. The Tx/Rx module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The processor 120 may be configured to control the Tx/Rx module to transmit data or messages according the proposal of the present invention. The memory 130 may store the calculated and processed information for a predetermined time, and may be replaced by another constituent such as a buffer (not shown).

Referring to FIG. 15, the network node 200 according to the present invention may include a Tx/Rx module 210, a processor 220 and a memory 230. The Tx/Rx module 210 may be referred to as an RF unit. The Tx/Rx module 210 may be configured to transmit and receive various signals, data and information to and from an external device. The network node 200 may be connected to the external device by wire and/or wirelessly. The Tx/Rx module 210 may be embodied to be divided into a transmitter and a receiver. The processor 220 may control overall operation of the network node 200, and be configured to calculate and process information for the network node 200 to transmit and receive to and from the external device. In addition, the processor 220 may be configured to perform the proposed operations of the network node. According to the proposal of the present invention, the processor 220 may control the Tx/Rx module 210 to transmit data or a message to a UE or another network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The processor 220 of the network node 200 may control the RF unit 210 of the network node to receive PDU session information of the UE. The processor 220 may control the RF unit 210 to transmit a request for establishing PDN connection in a second system to which the network node 200 belongs, based on the session information. The UE may have a plurality of PDU sessions to be handed over to the second system from a first system and the plural PDU sessions may include a primary PDU session and one or more secondary PDU sessions, for the same DN. If a default bearer of the PDN connection to which the primary PDU session is mapped in the second system does not satisfy a QoS level of the secondary PDU sessions, the processor 220 may control the RF unit 210 to transmit a dedicated bearer create request for the PDN connection. The session information may include information about the QoS level of the secondary PDU sessions. The session information may include a QoS level of the primary PDU session. The default bearer may be established to have a QoS level corresponding to the QoS level of the primary PDU session. If the default bearer satisfies the QoS level of the secondary PDU sessions, the processor 220 may not request creation of the dedicated bearer for the secondary PDU sessions and may map the secondary PDU sessions to the default bearer. The first session information may include an Internet protocol (IP) address of the primary PDU session when the primary PDU session is session and service continuity (SSC) mode 1 and may not include the IP address of the primary PDU session when the primary PDU session is not SSC mode 1. If the primary PDU session is SSC mode 1, an IP address of the PDN connection used in the second system may be equal to an IP address of the primary PDU session used in the first system. The second system may be an evolved packet system (EPS) and the first system may be a new system (e.g., 5G system) which is more evolved than the second system. The RF unit 210 may receive the session information from a core network of the first system or from the UE. The session information may include information indicating the primary PDU session among the plural PDU sessions. The network node 200 may be an MME.

The processor 120 of the UE 100 may control the RF unit 110 of the UE 100 to receive a handover command from the first system to the second system. The processor 120 may control the RF unit to transmit first session information regarding a primary PDU session among a plurality of PDU sessions for the same DN, that the UE is using in the first system. The processor 120 may establish a PDN connection with the second system based on the first session information and map the primary PDU session to the PDN connection. If a dedicated bearer for PDU sessions (secondary PDU sessions) other than the primary PDU session among the plural PDU sessions needs to be established, the processor 120 may control the RF unit 110 to transmit a bearer create request message for requesting creation of the dedicated bearer for the PDN connection. The processor 120 may control the RF unit to transmit the first session information and may be configured to deactivate the secondary PDU sessions. The processor 120 may be configured to reactivate the inactivated secondary PDU sessions by mapping the secondary PDU sessions to a default bearer of the PDN connection or the dedicated bearer after establishing the PDN connection. If a default bearer of the PDN connection does not satisfy QoS level of the secondary PDU sessions, the processor 120 may control the RF unit 110 to transmit the bearer create request message. The processor 120 may be configured to generate the dedicated bearer within the PDN connection and map the secondary PDU sessions to the dedicated bearer. If the default bearer satisfies the QoS level of the secondary PDU sessions, the processor 120 may control the RF unit not to transmit the bearer create request message and map the secondary PDU sessions to the default bearer. The first session information may include an Internet protocol (IP) address of the primary PDU session when the primary PDU session is SSC mode 1 and may not include the IP address of the primary PDU session when the primary PDU session is not SSC mode 1. If the primary PDU session is SSC mode 1, an IP address of the PDN connection may be equal to an IP address of the primary PDU session used in the first system. The second system may be an evolved packet system (EPS) and the first system may be a new system (e.g., 5G system) which is more evolved than the second system.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

The invention claimed is:

1. A method performed by a user equipment, UE, for performing handover from a next-generation, NG, system to a 4G system, wherein the UE is connected to the NG system with multiple protocol data unit, PDU, sessions for a same data network, DN, including a primary PDU session and a secondary PDU session, the method comprising:
receiving a command for handover to the 4G system;
transmitting first session information regarding the primary PDU session to a network, wherein the first session information informs a quality of service, QoS, level of the primary PDU session;
establishing a packet data network, PDN, connection with the 4G system based on the first session information and mapping the primary PDU session to a first bearer of the PDN connection which satisfies the QoS level of the primary PDU session; and
determining whether to create a second bearer for the secondary PDU session,
wherein, determining whether to create the second bearer comprises:
based on the first bearer not satisfying a QoS level demanded by traffic of the secondary PDU session, triggering creation of the second bearer by transmitting a bearer resource allocation request to a PDN Gateway, P-GW; and
based on the first bearer satisfying the QoS level demanded by the traffic of the secondary PDU session, transmitting the traffic of the secondary PDU session to the first bearer without triggering the creation of the second bearer.

2. The method of claim 1, further comprising:
after transmitting the first session information, deactivating the secondary PDU sessions; and
reactivating the deactivated secondary PDU sessions by mapping the secondary PDU sessions to the first bearer or the second bearer after establishing the PDN connection.

3. The method of claim 1,
wherein the first session information includes an Internet protocol, IP, address of the primary PDU session when the primary PDU session is session and service continuity, SSC, mode 1 and does not include the IP address of the primary PDU session when the primary PDU session is not SSC mode 1.

4. The method of claim 1,
wherein, based on the primary PDU session being session and service continuity, SSC, mode 1, an Internet protocol, IP, address of the PDN connection is to the same as an IP address of the primary PDU session used in the first NG system.

5. A user equipment, UE, for performing handover from a next-generation, NG, system to a 4G system, wherein the UE is configured to connect to the NG system with multiple protocol data unit, PDU, sessions for a same data network, DN, including a primary PDU session and a secondary PDU session, the UE comprising,
a radio frequency, RF, unit, and
a processor configured to control the RF unit, wherein the processor is configured to:
control the RF unit to receive a command for handover to the 4G system;
control the RF unit to transmit first session information regarding the primary PDU session to a network, wherein the first session information informs a quality of service, QoS, level of the primary PDU session;
establish a packet data network, PDN, connection with the 4G system based on the first session information and map the primary PDU session to a first bearer of the PDN connection which satisfies the QoS level of the primary PDU session; and
determine whether to create a second bearer for the secondary PDU session,
wherein, determining whether to create the second bearer comprises:
  based on the first bearer not satisfying a QoS level demanded by traffic of the secondary PDU session, trigger creation of the second bearer by transmitting a bearer resource allocation request to a PDN Gateway, P-GW; and
  based on the first bearer satisfying the QoS level demanded by the traffic of the secondary PDU session, transmit the traffic of the secondary PDU session to the first bearer without triggering the creation of the second bearer.

6. The UE of claim 5,
wherein the processor is configured to control the RF unit to deactivate the secondary PDU sessions after transmitting the first session information, and is configured to reactivate the deactivated secondary PDU sessions by mapping the secondary PDU sessions to the first bearer or the second bearer after establishing the PDN connection.

7. The UE of claim 5,
wherein the first session information includes an Internet protocol, IP, address of the primary PDU session when the primary PDU session is session and service continuity, SSC, mode 1 and does not include the IP address of the primary PDU session when the primary PDU session is not SSC mode 1.

8. The UE of claim 5,
wherein, based on the primary PDU session being session and service continuity, SSC, mode 1, an Internet protocol, IP, address of the PDN connection is equal to an IP address of the primary PDU session used in the NG system.

* * * * *